Feb. 20, 1923. Re. 15,547

R. A. STEPS

METHOD OF AND MEANS FOR WASHING CENTRIFUGALS

Original Filed July 25, 1922 7 sheets-sheet 1

Inventor

Robert A. Steps

By Muller & Greene,

Attorneys

Feb. 20, 1923. Re. 15,547
R. A. STEPS
METHOD OF AND MEANS FOR WASHING CENTRIFUGALS
Original Filed July 25, 1922 7 sheets-sheet 2
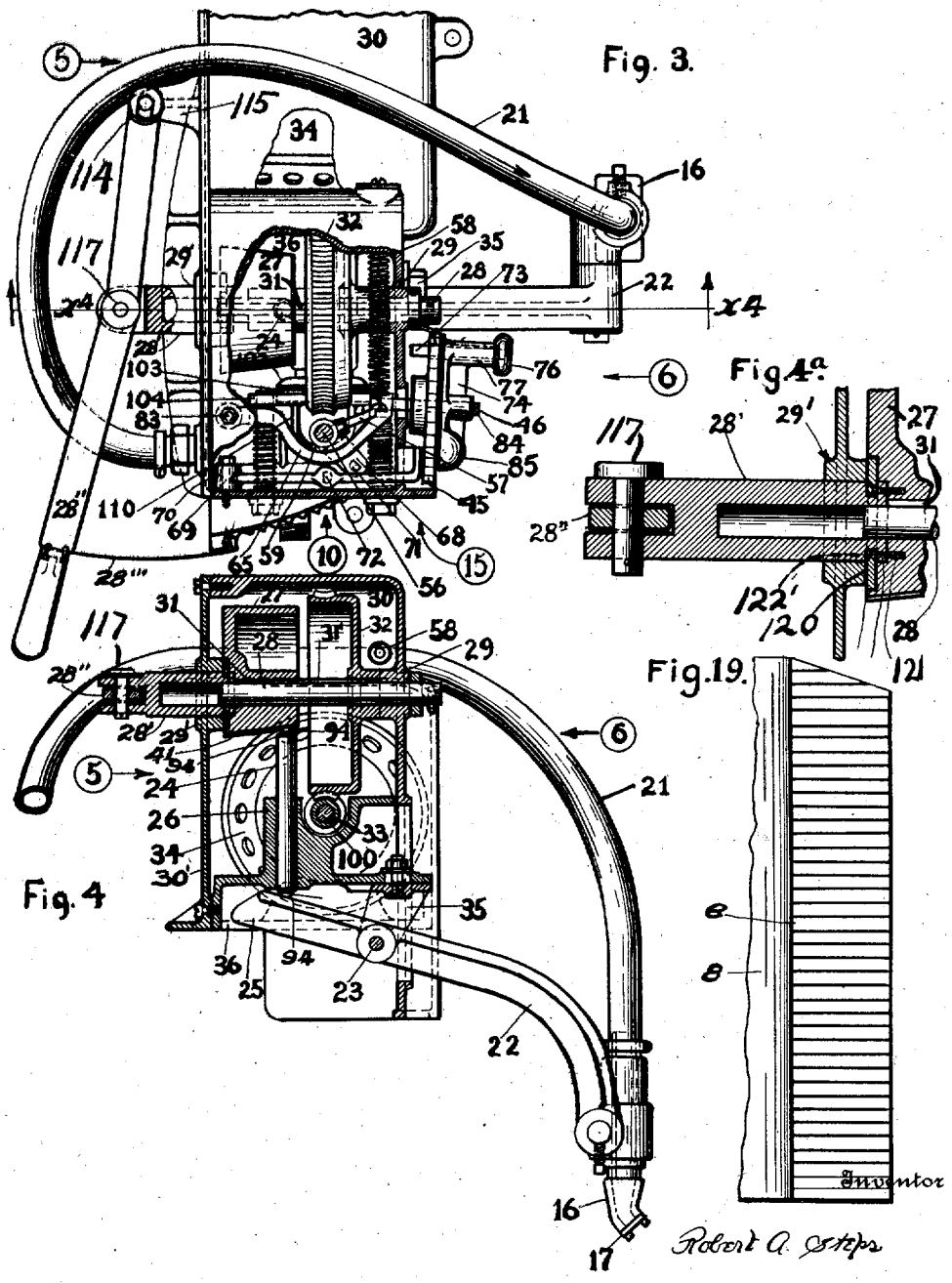

Feb. 20, 1923. Re. 15,547

R. A. STEPS

METHOD OF AND MEANS FOR WASHING CENTRIFUGALS

Original Filed July 25, 1922 7 sheets-sheet 3

Inventor

Robert A. Steps

By Browne & Greene,

Attorneys

Feb. 20, 1923. Re. 15,547

R. A. STEPS

METHOD OF AND MEANS FOR WASHING CENTRIFUGALS

Original Filed July 25, 1922 7 sheets-sheet 4

Inventor

Robert A. Steps

By Greene & Greene,

Attorneys

Feb. 20, 1923. Re. 15,547
R. A. STEPS
METHOD OF AND MEANS FOR WASHING CENTRIFUGALS
Original Filed July 25, 1922 7 sheets-sheet 5
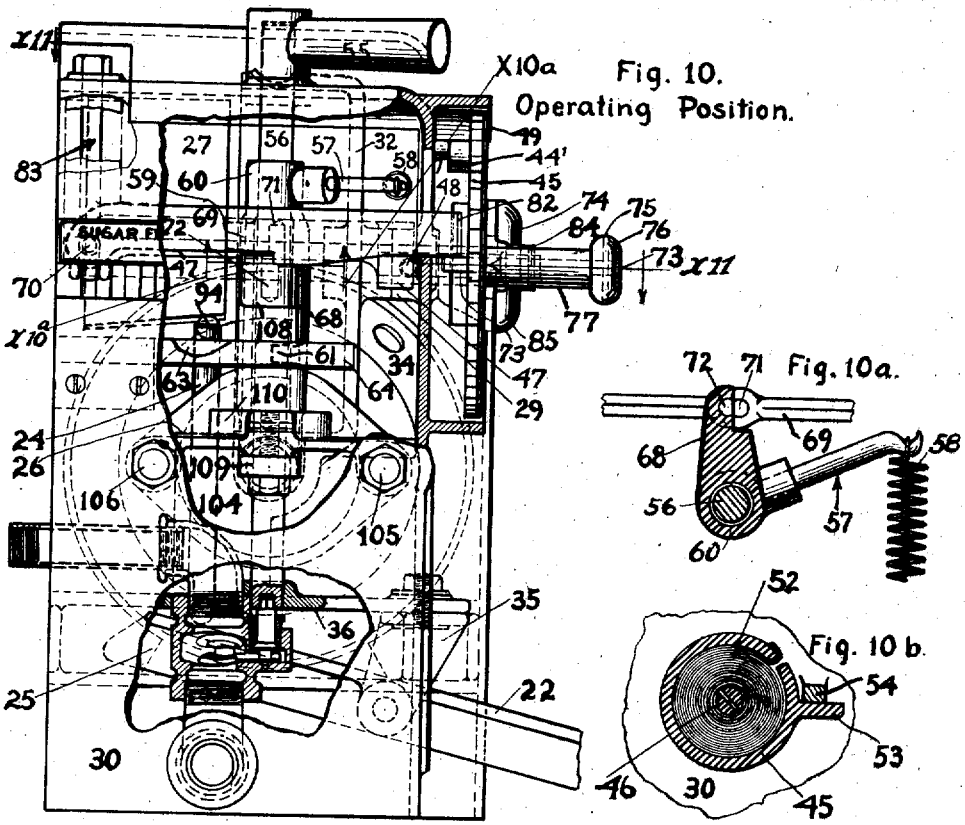
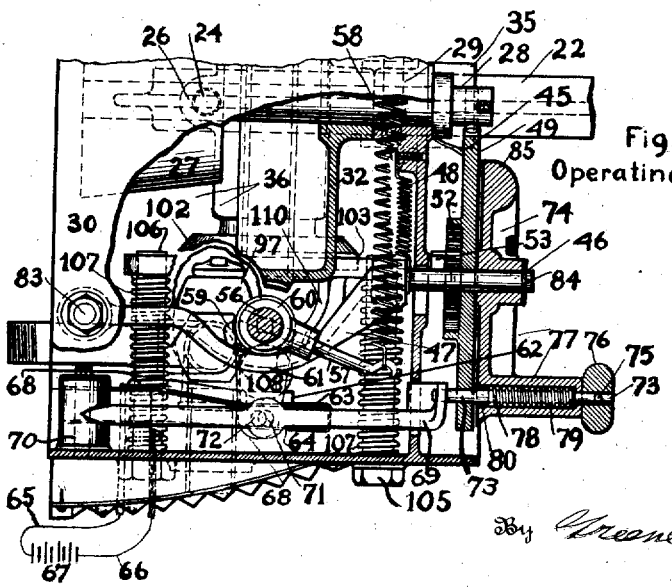
Inventor
Robert A. Steps
By Greene & Greene,
Attorneys Feb. 20, 1923. Re. 15,547

R. A. STEPS

METHOD OF AND MEANS FOR WASHING CENTRIFUGALS

Original Filed July 25, 1922 7 sheets-sheet 6

Operating Position.

Rest Position.

Inventor

Robert A. Steps

By Brown & Brown,

Attorneys

Feb. 20, 1923. Re. 15,547

R. A. STEPS

METHOD OF AND MEANS FOR WASHING CENTRIFUGALS

Original Filed July 25, 1922 7 sheets-sheet 7

Inventor

Robert A. Steps

By Kenneth Greiner

Attorneys

Reissued Feb. 20, 1923. Re. 15,547

UNITED STATES PATENT OFFICE.

ROBERT ALEXANDER STEPS, OF LOS ANGELES, CALIFORNIA, ASSIGNOR TO SUGAR MACHINERY COMPANY, OF LOS ANGELES, CALIFORNIA, A CORPORATION OF CALIFORNIA.

METHOD OF AND MEANS FOR WASHING CENTRIFUGALS.

Original No. 1,423,583, dated July 25, 1922, Serial No. 350,046, filed January 7, 1920. Application for reissue filed January 10, 1923. Serial No. 611,825.

*To all whom it may concern:*

Be it known that I, ROBERT ALEXANDER STEPS, a citizen of the United States, residing at Los Angeles, in the county of Los Angeles and State of California, have invented a new and useful Method of and Means for Washing Centrifugals, of which the following is a specification.

An object of this invention is to wash sugar in centrifugals with absolute mathematical precision and to accomplish the result with the minimum possible amount of water.

In sugar manufacture the usual operation of separating the syrup from the sugar consists in supplying the slowly rotating centrifugal basket with a charge of massecuite and then increasing the speed so that the rotation of the basket when brought up to full speed causes the syrup to be thrown outward into a housing while the sugar crystals are retained by the basket, thus forming a hollow cylinder, the usual cavity in which is apparently of an inverted frusto-conical form; but sometimes is apparently cylindrical. This body of sugar crystals is more or less compact and requires to be washed with pure water in order to remove from the outer sides of the crystals, the syrups and other substances foreign to the sugar, which adhere to the surfaces of the crystals. It is important to supply to each portion of the body the exact amount of water that is required for such washing, and that will effect the washing with the least possible dissolving action upon the sugar.

I have discovered that the axial section of the cavity in the massecuite charge is of the form of a truncated parabola and that the major axis or principal diameter of the parabola increases and decreases inversely as the mass of the charge under the same conditions of size and speed of basket.

In practical operation, according to common practice, the massacuite is introduced into the basket while the basket is rotating at about 80 to 100 revolutions per minute and when the requisite charge has been introduced, the basket is immediately speeded up to about 1100 revolutions per minute, as a safe maximum of speed for an inside diameter of 40 inches, with the result that the syrups are discharged by centrifugal action; leaving a practically rigid sugar column which remains unchanged in form after the syrups have been discharged.

This invention and discovery relates to the washing of such column of fixed dimensions and I have discovered that such dimensions are invariable under a predetermined speed and quantity of charge and that therefore it is possible to wash the column uniformly by conformance to calculations based on the truncated parabolic form of the axial section of such column.

The broad and essential discovery and invention herein involved are pioneer, primary and basic as there has heretofore been no suggestion in the art, that it is possible to improve the present methods and means, by successively delivering to predetermined zones of the sugar column a differential spray of wash water, delivering to each zone a quantity of water directly and accurately proportional to the mass of sugar in such zone.

The invention and discovery involve the method and certain novel apparatus and parts and combination of parts as will hereinafter more fully appear.

I have discovered that at a speed of about 1100 revolutions of the basket per minute, more or less, the frusto-conical projection of the cavity is substantially of parabolic form when the sugar is piled up by the centrifugal action at that speed; and that the amount of wash water to be applied at any level for the purpose of washing the cross-section of the sugar content at that level can be accurately determined by applying a cam to operate an oscillating nozzle to cause the nozzle oscillation to conform to such parabola; and a principle of this invention is that which governs the mechanism whereby the quantity of wash water delivered to any portion of the interior surface of the hollow sugar mass is exactly proportional to the thickness of the mass where the water is delivered.

I have discovered that it is possible to wash the hollow column of sugar accurately by supplying to the walls of the cavity a definite vertically narrow spray of water timed in its successive application to the various levels in accordance with the thickness of the sugar wall at each level; and I have also discovered that such timing can be effected by means of a cam arrangement in which the active trace that is to say, the contacting line of the cam is constructed to cause an oscillation of the nozzle speeded with direct relation to the thickness of the wall of massecuite outside the parabolic trace where the water is applied; and I have also discovered that the operation of the nozzle along such wall can be varied to conform to the different shapes of the cavity which are produced by different sized charges of massecuite, or by different modes of loading or of speeding up after loading. This is accomplished by having an adjustable cam having a succession of cam traces.

An object is to make provision for quick easy adjustment for distributing water differently to the accumulated massecuite as the accumulations thereof flare differently; that is to say, in practice the massecuite in the centrifugal basket flares in proportion to the amount of the charge put into the basket. In practice, where a light charge of massecuite is treated, the inside walls of the charge may be approximately vertical, while with a heavier charge the walls may have a considerable flare being thicker at the bottom and thinner at the top of the walls which are externally cylindrical.

An object of the invention is to make provision whereby the wash water will be applied to the different portions of the wall in mathematically correct proportion to the relative thickness of the wall so that where a greater quantity of the massecuite is to be washed by the horizontal flow of water therethrough under the centrifugal impulse, a requisite quantity of wash water will be applied and each portion of the wall will be supplied at any level according to the thickness of the mass at that level.

An object of the invention is to make provision whereby the operation of washing the centrifugals may be performed in a practically automatic way with minimum attention on the part of the attendant; and to enable an attendant to easily learn how to operate the machine.

An object of the invention is to avoid cutting the inside surface of the sugar mass into ridges, and in the invention I have provided means whereby this is avoided and said means includes not only the original mechanism for delivering the wash water in proportional quantities at the different levels, but also in delivering the water in such a form as to minimize the tendency to cut the sugar surface into ridges. This is effected by delivering the wash water through a nozzle of peculiar construction adapted to project a thin angular spray across the cavity and against the revolving wall which receives it.

Another feature of the invention is the provision of mechanism whereby the washing is instantly started and stopped at the exact position of the nozzle where such starting and stopping may be effected without disturbing the proper proportional delivery of the wash water.

Other objects, advantages and features of invention may appear from the accompanying drawings, the subjoined detail description and the appended claims.

The invention may be carried out in various ways; and although it includes the method, the apparatus, the parts and combination of parts, I do not limit myself to specific constructions but may make changes from time to time without departing from the spirit of the invention. As to the method, that can obviously be carried out by various types of mechanism.

The discovery and invention may be understood by reference to the accompanying drawings which show one form of embodiment with an adjustable cam. The numbers in the arrow circles indicate sight directions for some of the views of corresponding numbers.

Fig. 3 is an enlarged plan of the oscillating spray device shown in Figs. 1 and 2; parts being broken away to expose interior construction. The parts are shown in rest position with the dial oscillated by spring 58 acting on the tripping cam.

Fig. 4 is a sectional elevation on line $x^4$, Fig. 3, looking in the direction of the arrows.

Fig. $4^a$ is an enlarged fragmental detail of the connection between the cam and the operating sleeve on the cam shaft, a fragment of which is shown.

Figure 5:
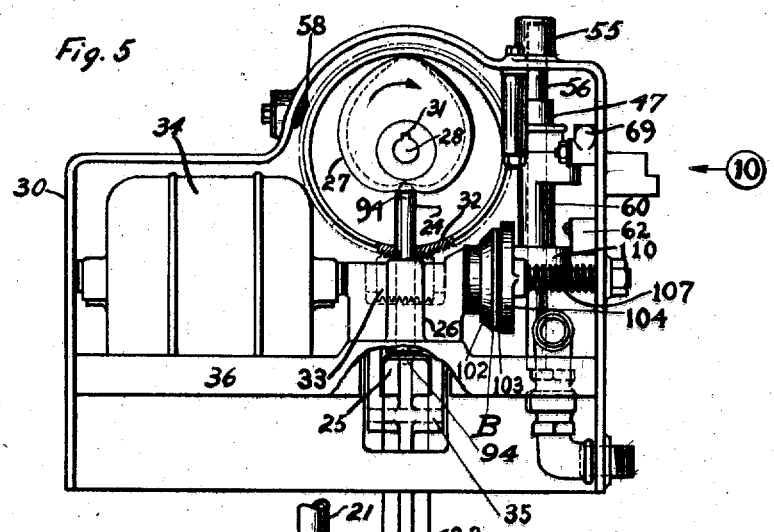

Fig. 5 is an elevation viewed as indicated by the arrows 5 in Figs. 3 and 4; the detachable end of the housing being removed and not shown.

Figure 6:
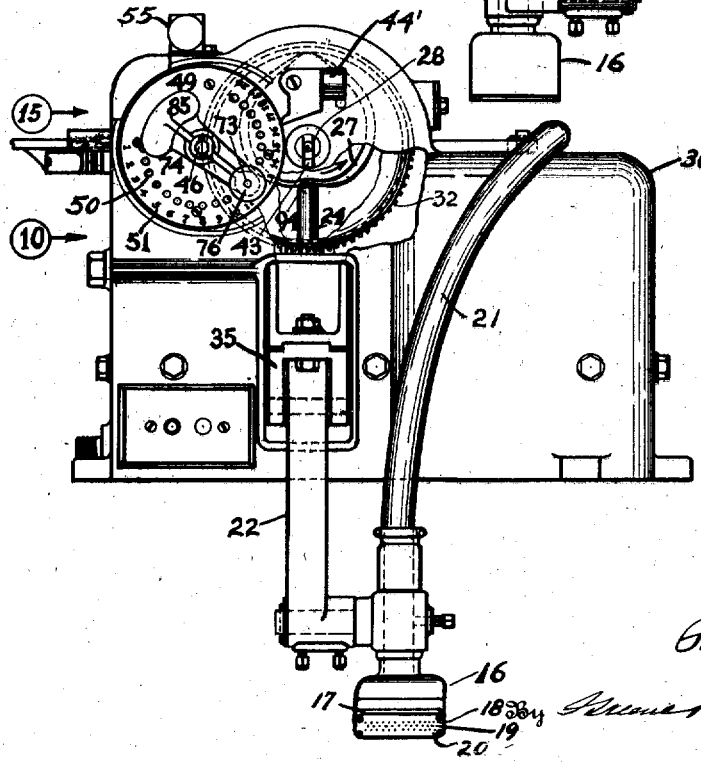

Fig. 6 is an elevation of the spraying device from the spraying side, showing the timer in the rest position. Parts are broken away to expose interior mechanism. This view is from the rear of Fig. 5 and the direction of sight is indicated in Figs. 1, 2 and 3 by the arrows 6.

Figure 7:
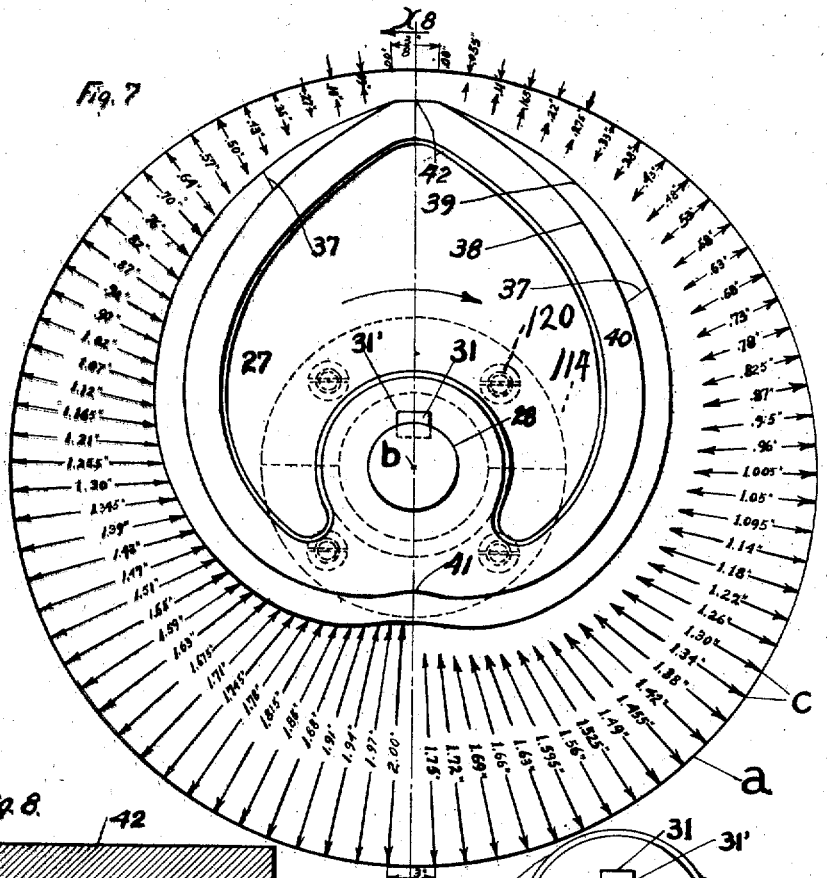

Fig. 7 is a full size plot of a cam constructed for a machine adapted for use in washing the charge in a centrifugal basket forty inches in diameter and twenty-four inches deep.

Figure 1:
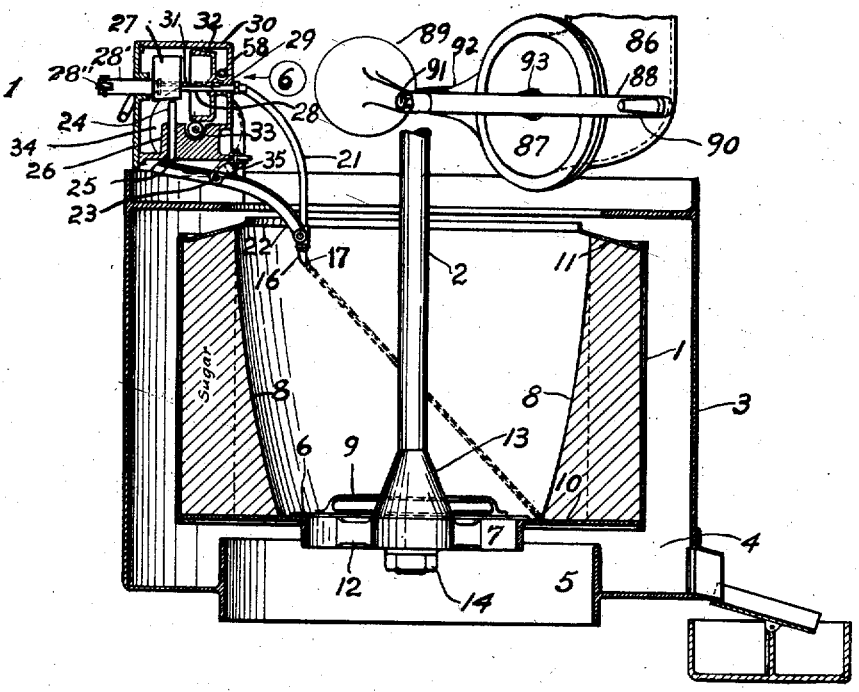
Figure 1 is an elevation partly in section on line $x^1$ Fig. 2 showing the washer applied to a centrifugal machine having therein a flared charge of massecuite or sugar mass which is being washed by a jet from the washer that is shown approximately at the rest position which it occupies at the starting, and at the finishing wash operations, respectively.
Figure 2:
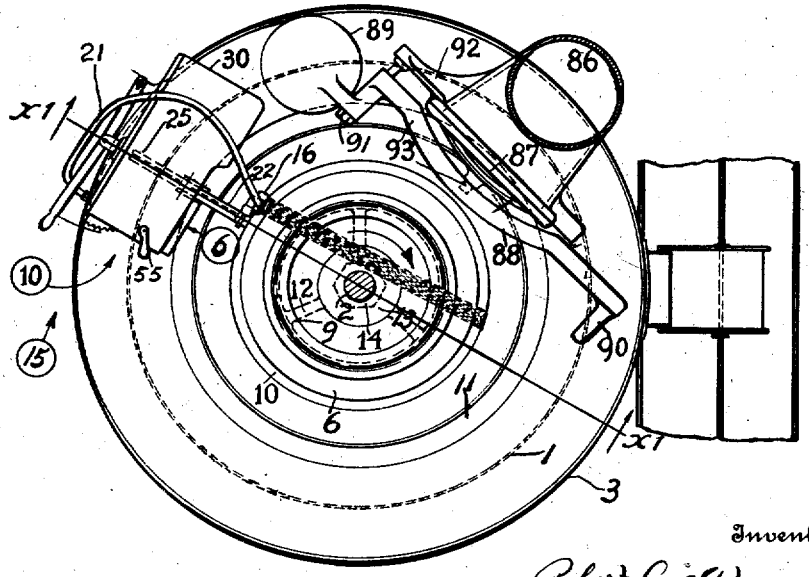
Fig. 2 is a plan of the apparatus as shown in Fig. 1.
Figure 18:
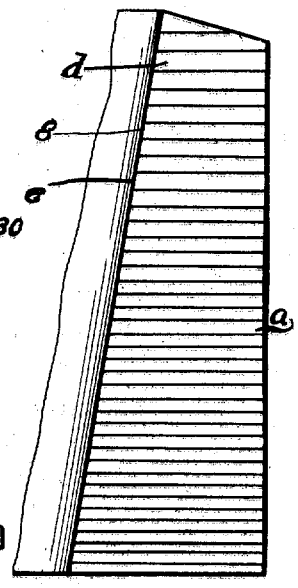
Figure 8:
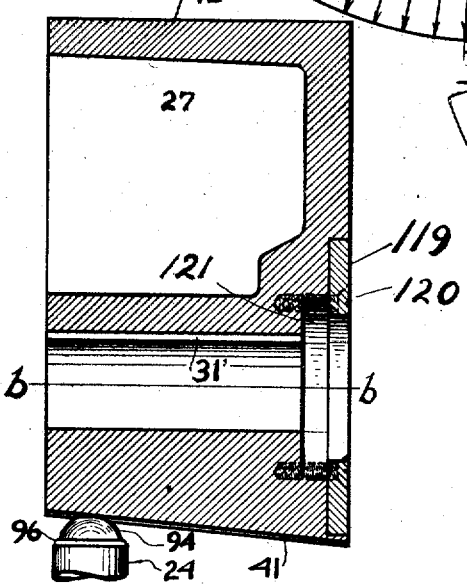

Fig. 8 is a section of the cam on line $x^8$, Fig. 7 showing also a fragment of the spray oscillating tappet adjusted to the position shown in Figs. 1 and 4 for washing flaring sugar columns such as shown in Fig. 18.

Figure 9:
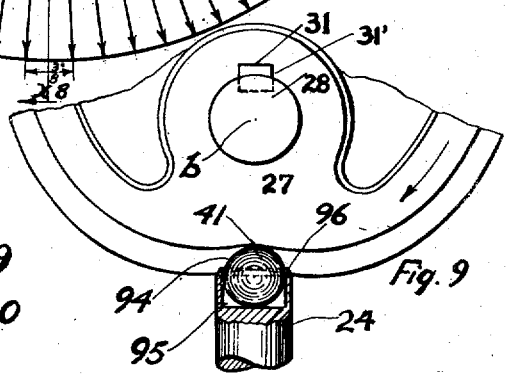

Fig. 9 is a fragmental elevation of the cam shown in Fig. 7 with a fragment of tappet adjusted to position for washing a flaring sugar column.

Fig. 10 is an elevation in running or washing position, of the mechaism for starting and stopping the spraying apparatus. The stopping pin is within one step of releasing the tripping device. Parts are broken away to expose details of construction.

Fig. $10^a$ is an inverted plan sectional detail viewed from horizontal portion of line $x^{10a}$, Fig 10; looking up in the direction of the arrows on said line.

Fig. $10^b$ is a fragmental sectional detail of the clock spring connection for returning the dial and unlatching pin to initial position indicated by the first of the ordinals 51.

Figure 11A:
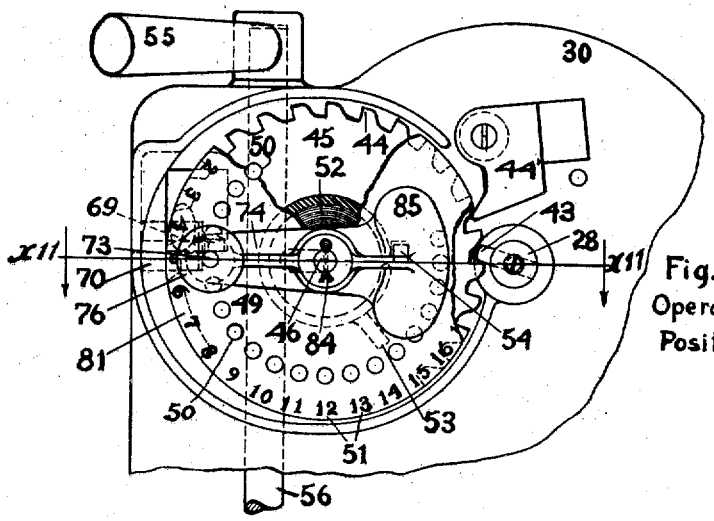

Fig. 11 is a fragmental plan partly in section on irregular line $x^{11}$—$x^{11}$, Figs. 10 and $11^a$; showing the position of the timer in Figs. 10 and $11^a$ during the washing operation.

Fig. $11^a$ is a projection from Fig. 11 showing the timer dial and poise, with pawl and operating tooth in operating position.

Figure 12:
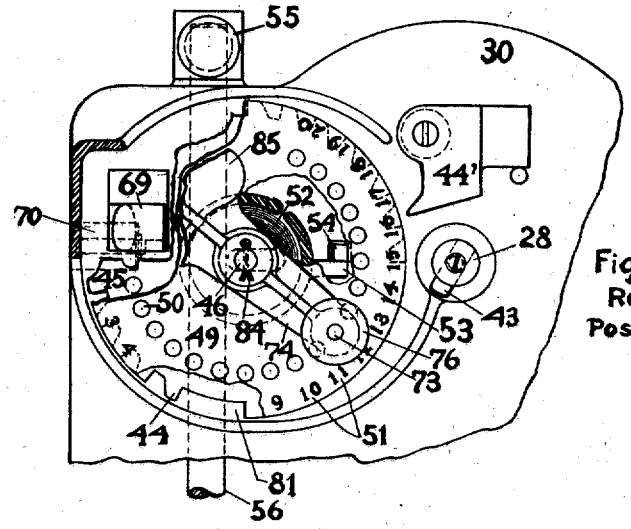

Fig. 12 is an enlarged fragmental elevation of the timer with the ratchet wheel oscillated; to the rest position shown in Figs. 3, 4, 5 and 6. The dial is partly broken away to show the ratchet teeth and the safety notch. Parts are also broken away to show interior construction.

Figure 13:
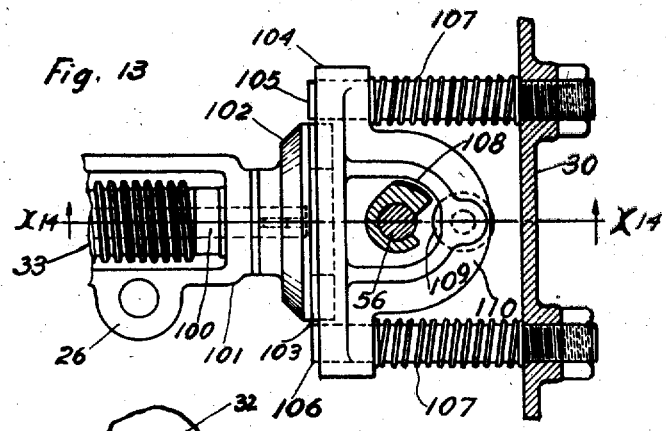
Figure 14:
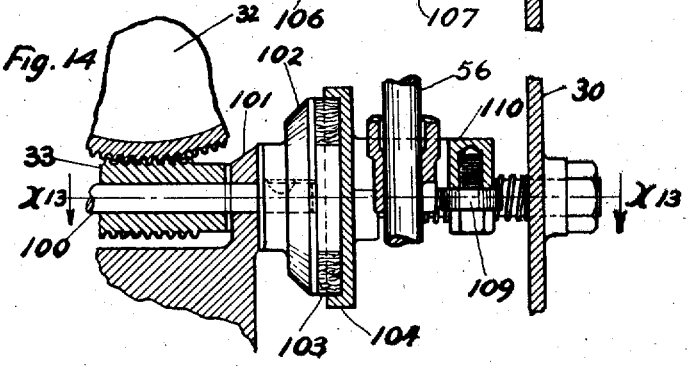

Fig. 13 is a fragmental plan detail partly in section on line $x^{13}$, Fig. 14, illustrating the automatic means for instant arrest of the spraying nozzle at the end of the spraying operation.

Fig. 14 is a fragmental elevation partly in section on line indicated at $x^{14}$, Fig. 13.

Figure 15:
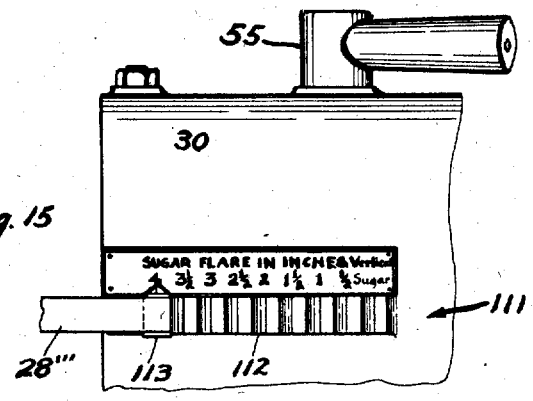

Fig. 15 is an elevation of the indicator of the cam adjusting device viewed from the direction indicated by the arrow 15 in Figs. 2, 3 and 6.

Figure 16:
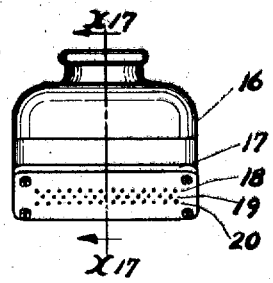

Fig. 16 is an enlarged front view of the nozzle.

Figure 17:
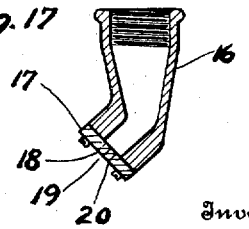

Fig. 17 is a section on line $x^{17}$, Fig. 16.

Fig. 18 is a plot of a radial section through one side of a hollow flaring sugar column for determining the cam surface for oscillating the nozzle. This view is on a reduced scale as compared to Fig. 7.

Fig. 19 is a section analagous to Fig. 18 of a sugar column formed by a smaller charge and having a less flare than the column section detailed in Fig. 18.

As is customary in the art, the cylindrical basket 1 carried by and revolving with the driving shaft 2 is mounted inside the housing 3 which is provided with a syrup collector 4 and with a discharge outlet 5 for the finished product. Said basket is of the usual construction of centrifugal baskets and is provided with an annular bottom cover 6 to close the outlet opening 7 through which the sugar of the hollow column 8 is to be discharged when such column is broken down; a handle 9 being provided for lifting up the annular cover when it is desired to discharge the sugar.

The side walls of the basket 1 are formed of a very fine slotted sheet brass screen; and the floor 10 and the top flanges 11 are impermeable except at the discarge period in accordance with the usual construction of sugar centrifugal baskets. The floor 10 is connected to the shaft 2 by the spider 12 extending outward from a conical hub 13 which is secured on the shaft 2 by a nut 14.

*The nozzle.*

The nozzle 16 is formed as a hollow head having a front wall 17 pierced with three horizontal rows 18, 19, 20, of fine perforations which in practice may be 3/64 of an inch in diameter, the aggregate of all the holes equaling the area of a 5/16 inch diameter nozzle; the upper and lower rows 18 and 20 having fourteen holes each and the middle row 19 containing thirteen holes; the rows being about two and five tenth inches long and the holes being spaced apart about 3/16 of an inch. The water is delivered to the nozzle through a flexible hose 21 carried by an oscillating arm 22.

Iu practice with a basket of forty inches diameter and twenty-four inches depth, and with a nozzle such as described, the hose is supplied with water under a head to produce a pressure of about twenty pounds per square inch at the spray outlets so that the spray is initiated by forty-one fine jets distributed in an oblong rectangular figure that is two and one-half inches long horizontally, and one fourth of an inch wide, vertically, Of course, these exact proportions can be considerably varied, as the spirit of my invention, where I claim an "elongated" spray, requires only that the shape be longer in its general horizontal direction than it is in its vertical direction, an elliptical or other elongated shape being as good as a rectangular shape, and, of course, without departing from the spirit of my invention, the longer axis may be slanted away from a true horizontal by adjusting the nozzle at any of the adjustable points shown, for instance, in Figure 6, and in many respects my invention can obviously be practised without an "elongated" spray, so long as it is quite thin vertically compared with the height of the basket to allow sufficiently accurate placing of the water. The upper and lower parts of the stream should be more parallel than in previous automatic washers generally known and patented.

*Nozzle oscillator.*

The oscillating lever has an arm 22, is pivotally mounted on an axis 23, and is operable by a tappet 24 which contacts upon the upper surface of the tappet arm 25 of the oscillating lever. Said tappet 24 operates in a stationary guide 26 and is normally upheld by the arm 25 owing to the gravity of the longer arm 22 and the nozzle 16 and hose 21 supported thereby, so that the tappet 24 is normally pressed upward into contact with the face of the differential cam 27; which is revolved by means of a shaft 28. The differential nozzle oscillating cam 27 is mounted to rotate with the shaft 28 and to slide thereon. The shaft 28 is journaled in bearings 29, 28′, and 29′ carried by the case 30. The bearings 29, 29′ are fixed to the case 30 and its removable side 30′. The bearing 28′ is a sleeve sliding in fixed bearing 29′ of the removable case cover 30′, and is swiveled to the cam 27. The cam is slidable along and is rotatable by shaft 28, there being a spline 31 along the shaft and a groove 31′ in said cam which allows the cam to be shifted longitudinally of the shaft to bring into contact with the tappet, whatever portion of the perimeter of the cam may be requisite to the work in hand. Adjustment and retention of the same is effected by a hand lever 28″ yieldingly held by the spring ratchet 28‴. Of course the advantages of having a cam with various traces, and with the adjusting means for bringing the various traces into the operative position, may be omitted, and in place a simple cam may be used with only one trace, and the adjusting means omitted, and this more elementary embodiment of my invention is useful in factories where the amount of sugar flare—that is, the amount by which the sugar flares in at the bottom as compared with the top—is practically constant from charge to charge and from day to day.

The nozzle 16 is mounted to oscillate up and down at one side of the rim of the basket 1 and is directed across the cavity thereof adjacent to, but at one side of the driving shaft 2, so as to allow the jets to break up into a fine stream of water and air commingled and to be directed practically normal to the curved inner face of the hollow sugar column 8.

The cam shaft 28 is rotated at a desired speed by means of a worm wheel 32 fixed to the shaft by spline 31 and rotated by a worm 33 driven by a motor 34.

*Motor connection.*

The convenient motor for this nozzle oscillator is in the form of an induction motor which is peculiarly adapted to this work for the reason that it can be instantly started and also instantly stopped through application of a brake which forms a part of a combination I have provided therefor, in this invention.

Said induction motor is applicable for use in connection with an alternating electric current, but where an alternating current is not available a direct current motor, not shown, may be used.

The nozzle oscillator is adjustable relative to the tappet by means of a slide bearing 35 supported by the stationary tappet guide 26. This is the means that I have selected for making the amplitude of the nozzle oscillation adjustable.

*The differential nozzle cam.*

By referring to Figs. 7, 18 and 19, the method of plotting a differential nozzle cam for any given diameter and speed of centrifugal will be understood. In reference to Figures 18 and 19, it should be mentioned that the mode of charging and spinning the sugar in centrifugals, is often such as to bring the trace of the sugar section into that portion of the parabola which is substantially a straight line, either sloping with reference to the shaft or axis, as in Figure 18, or running almost parallel thereto, as in Figure 19, and for purposes of simplification, this condition is assumed in this explanation.

The cam is plotted from a circle *a* having its center *b* at the axis of the cam 27 and its shaft 28, and said circle is divided into units, which for convenience in plotting the cam for a forty inch contrifugal, is taken as four square inches; so that there are forty units on the base circle indicated as bounded by outer arrow heads *c*. These units of circular measurement are correlative to the oblong four inch areas *d* which are cross-sections respectively of suppositional level layers *e* of the sugar column 8.

The function to be imposed upon the differential cam is the bringing of the thin narrow spray to the positions, successively, for those proportional periods, successively, which will result in bringing the wash water to the inside wall in the exact amounts predetermined by the thickness of the sugar wall at the successive levels.

The effective amount of wash water required for saturating a definite section of the sugar wall at any particular level will be determined by the thickness of the wall at such level, and therefore the spray which is constant through the nozzle must be delivered to the successive suppositional layers at the lower levels for periods of greater lengths, respectively, than at the higher levels.

The cam therefore is so constructed that the movement of the nozzle is comparatively slow at the lower level while the spray is being directed therefrom to the bottom of the sugar wall, and will be increased in speed as it approaches the top of the sugar wall; and the rate of movement while the spray is being delivered against a wall at any level will directly correspond to the thickness of the sugar wall at such level.

In order to systematically plot the cam for washing a sugar charge of predetermined dimensions, the longitudinal traces on the inside face of the sugar wall at any axial plane of section may be divided into spaces of equal area arbitrarily determined and bounded at top and bottom by horizontal planes and peripherally by the screen.

It is evident that such spaces at the lower thick portion of the hollow sugar column will be narrower than at the upper thinner portion and that the successive widths of the spaces will be in direct proportion to the thickness of the wall between the horizontal boundaries of such areas. By this method of calculation the form of the nozzle cam may be predetermined with practical exactitude.

In practice the amount of water required for washing a charge such as indicated, is distributed over the inner surface between the top and bottom of the column according to the up and down movement of the nozzle, the flow of the water being constant from beginning the washing operation at the bottom of the column, throughout a required number of oscillations; the nozzle oscillating to spray from bottom to top and returning the spray to the bottom of the column each time until the total amount of wash water required has been discharged. Said wash water will rush through the sugar body through the operation of centrifugal force, so that the entire washing operation is completed in about forty seconds more or less, and this period is determined by the number of oscillations, and in each of these the nozzle sweeps the spray from bottom to top and from top to bottom of the column. Under the conditions above stated the amount of water delivered through the nozzle during six full cycles or oscillations will be about two gallons, and this amount of wash water may prove sufficient for washing a light charge of sugar, having nearly vertical inside walls. The amount of water will have to be increased in proportion to the quantity of the charge and this increase is effected by increasing the number of oscillations. It is important, however, that the speed with which the nozzle moves opposite to any portion of the wall shall bear a definite relation to the thickness of the wall, and in order to meet this requirement the cam surface is made up of numerous traces differing from each other conformable to the different obliquities of the up and down traces of the cavity face.

The plotting in Fig. 7 is designed to comprise in one cam all of the cam-operating traces necessary for adjustment to wash a column having a vertical inside wall and to wash all of the forms of columns that are likely to occur. These separate traces are determined by simply calculating the two extremes and conforming the ends of the cam to said two extremes of practical angularity of the inside walls of the sugar columns, and then producing the cam surface between said extremes by reducing said surface to straight longitudinal trace 37 the ends of which conform to correlative points of the extreme cam traces 38, 39. Said longitudinal traces are oblique to the axis of the cam throughout a greater portion of the perimeter of the cam, but at the portion of the cam that is active at the top turn of the oscillation, said traces are parallel to such axis.

The speed of oscillation is determined by the angle of the tappet operating traces which extend around the cam. Thus by reference to Fig. 7 it may be assumed that 38 represents a cam operating trace for the extremely flaring sugar column and 39 may be considered the cam operating trace for a practically cylindrical sugar column. The cam may be assumed to travel clockwise as indicated by the curved arrow, and in such case the tappet being underneath as indicated in Fig. 8, the upstroke of the nozzle would be accomplished by the right half 40 of the cam between the stopping and starting point 41 and the upper turning point 42. The peripheral or tappet operating traces at 42 extend for a distance in a plane normal to the bisecting diameter indicated by line $x^8$ and a flat plane is formed at the apex 42 of the cam. The purpose of this plane 42 is to allow a period of rest for the nozzle at the top turn of the oscillation so as to there prolong the period of discharge so as to deliver at the top of the column a quantity of water sufficient to pass through and sufficiently cleanse the top portion of such column. This prolonged period of washing is necessitated because the centrifugal force acting upon the massecuite compacts the column more forcibly at the top than at any other part thereof. A further condition that necessitates a longer washing period at the top and also at the bottom relative to a certain thickness of column, is that the syrups adhere to the inside impermeable surfaces 10 and 11 at the top and bottom of the basket, and for this reason and for the further reason that the column may be much thicker at the bottom, the heel of the cam is formed with the depression at 41 as clearly seen in Figs. 7, 8, and 9. The longitudinal traces of the cam at 41, however are oblique to the axis *b* for the reason that the variations in thickness of the sugar column 8 have to be accounted for by the cam.

*Washer adjustment.*

The amount of wash water to be delivered to the column will be estimated by inspection as the operator breaks down a washed column of sugar. He will then note whether or not any syrups or brown sugar traces have been left in the column. The presence of syrup indicates the necessity of a greater number of oscillations so that a larger quantity of water will be delivered to the sugar column. In order to make such delivery practical there is provided a timer which will limit the periods of oscillation according to the requirements, and which can be set by the operator to stop operation of the nozzle and the supply of water thereto at the end of any predetermined requisite number of oscillations. This mechanism is illustrated in Figs. 6, 10, 10ª, 11, 11ª, 12, 13 and 14.

Referring to Fig. 6 it will be understood that the cam has run anti-clockwise as the cam is viewed from the end opposite that shown in Figs. 5 and 7, and has completed twelve full up and down oscillations. At each revolution of the cam anti-clockwise in Fig. 6 (the same being clockwise in Fig. 5) a complete oscillation of the nozzle 16 from bottom to top and from top to bottom has been effected.

The worm gear shaft 28, is provided with a single tooth 43. See Figs. 3, 6, 11ª and 12. Said tooth engages ratchet teeth 44 of ratchet wheel 45 and moves said wheel one tooth forward at each revolution of the cam. Said wheel 45 is mounted on an oscillating post 46 that is the free terminal of an oscillating arm 47 which is pivoted at 83 to the housing 30 near the top thereof, and is pressed by spring 48 towards the path of revolving tooth 43. See Fig 11. The wheel 45 is provided with a dial 49 fixed thereto, and both the dial 49 and the wheel 45 are provided with a number of pin holes 50, designated successively by dial ordinals 51 from 1 to 20 or such other number as may be required to include the full number of teeth 44 that may be acted on by tooth 43 from initial position to dripping position.

Said ratchet wheel with its dial is operably connected to a coil spring 52, which may be a common clock spring, the tendency of which is to return the wheel and dial to zero or rest position as in Figs. 6 and 12. A stop formed by a stationary stud 54 arranged in the path of a lug 53 which is rigid to the ratchet wheel 45 stops said wheel at the zero or rest position as indicated in Fig. 12.

The tooth 43 operated by worm gear cam shaft 28 acts to advance the ratchet wheel and to wind up the clock spring 52 step by step as the cam shaft revolves; the dog 44′ engaging teeth 44 as the operation proceeds, to prevent return of the ratchet wheel, which is therefore advanced one notch at each complete nozzle oscillation.

The power to operate the cam shaft, and water supply under pressure for washing the centrifugals, are both controlled by the controlling shaft 56.

To this end said shaft 56 is provided with an arm 57 operated by a spring 58, to turn and normally hold it in rest position where both the power and the wash water are cut off.

The controlling shaft 56 is provided with a cam 59 mounted thereon by means of a sleeve 60 that is shown as being fixed to the shaft by the retracting arm 57. The retarding spring 58 operating through arm 57, the shaft 56 and the cam 59 is adapted to oscillate the oscillating arm 47 and ratchet wheel 45 from operating position shown in Figs. 10, 11 and 11ª to the stop or rest position in Figs. 3, 6 and 12. The retracting arm 57 and sleeve 60 on shaft 56 are operable by the spring 58 to rotate the shaft sufficiently to cause the cam 59 to oscillate the arm 47 and ratchet wheel 45 to the stopping position shown in Figs. 3, 6 and 12.

Said sleeve 60 is also provided with a cam 61 adapted to engage an insulating block 62 and thereby move the contacting spring 63 to close the electrical operating circuit through the contact 64; the contacts being connected by wires 65, 66 with the source of electrical energy as the battery 67 for operating the motor 34. The cams 59 and 61, are alternate in their operation; the cam 59 acting on the arm 47 only when the cam 61 is not acting upon the contacts, see Fig. 11, and vice versa. The sleeve 60 is also provided with a latch finger 68 that is adapted to engage a latch 69 for the purpose of holding shaft 56 from oscillating responsive to spring 58 until the latch 69 is raised. Said latch is shown pivoted on a horizontal pivot at 70, and when free, lowers by gravity so that a tooth at 71 on said latch is in position to intercept a catch at 72 on the finger 68, thus to hold the shaft from turning. The tooth and catch are reinforced by hard cylindrical steel pins at 71 and 72 that are flat on one side and seated in the latch and finger, respectively which may therefore be made of cast iron. Said latch is adapted to be lifted and unlatched by a set pin 73 carried by the ratchet wheel and adjustably positioned thereon by being inserted through the holes 50. When the latch is lifted it releases the controlling shaft 56 and allows it to turn part way around, responsive to the spring 58, and to return to the rest position shown in Figs. 6 and 12, with the circuit broken and the water supply cut off from the nozzle.

The pin 73 is rigid to the dial plate 49 and ratchet wheel 45 when it is passed through any one of the holes 50, and is made adjustable to any of said holes, by means of a poise 74 that is freely pivoted on the oscillating post 46 at the center of the ratchet wheel, and in which poise said pin is reciprocable.

The clock spring 52 is fixed at one end to the oscillating post 46, and at the other end to the ratchet wheel, and when the cam 59 oscillates the arm 47 and tilts the ratchet wheel in a manner evident from Figs. 11 and 3, the ratchet teeth escape the tooth 43 and pawl 44′ thus allowing the clock spring to revolve the ratchet wheel back to initial position where lug 54 engages stud 53. The spring 58 still holds the wheel tilted. Then the operator may, by means of handle 55, turn the controlling shaft into the latched position, thus withdrawing cam 59 from arm 47, and leaving the ratchet wheel free to be returned by spring 48, to position for engagement of the tooth 43 as in Figs. 10, 11 and 11ª. This causes cam 61 to operate, which again closes the circuit and starts the worm gear, thus revolving the cam and tooth on the worm gear shaft.

In Figs. 10, 11 and 11ª the pin 73 is ready to lift the latch and release shaft 56 when tooth 43 moves the ratchet wheel 45 the space of one more tooth. The instant the latch is lifted and the shaft is released, the spring 58 turns the shaft and causes cam 59 to oscillate arm 47 and post 46, overcoming spring 48 and thus tilting wheel 45 from the pawl 44′ and tooth 43, and allowing the clock spring to turn wheel 45 and pin 73 to the rest position of Fig. 10.

It is evident that the number of revolutions of the tooth 43 from rest position to shaft unlatching position is determined by the relative angular positions of the stop 53 and the set pin 73, and that such position may be changed by shifting said pin from one to another of the holes 50. Since the cam 27 is fixed to and turns with the same shaft 28 that carries tooth 43, it is clear that there is one oscillation of the nozzle for each ratchet tooth operated on by the tooth 43.

The number of oscillations of the nozzle, therefore at each period of ratchet operation is determined by the position at which the pin 73 is set. In Fig. 11ª the poise is set with pin 73 in the hole marked by the ordinal 5 indicating that one washing operation will include five complete oscillations of the nozzle. In Fig. 12 the poise is set for twelve oscillations. This is effected by setting the unlatching pin 73 in the twelfth one of the holes 50. To this end the set pin 73 is fixed by pin 75 to a head 76 and extends through a hollow standard 77 in which there is a helical spring 78 that is pressed into the chamber in said standard between the head 79 thereof and a collar 80 fixed to and integral with set pin 73. There is sufficient clearance for the coils of spring 78 between collar 80 and the head 79 to allow set pin 73 to be withdrawn from the ratchet wheel 45 so that the pin may be shifted to different positions and inserted through different ones of the holes 50, so that the travel of the pin may be increased or decreased accordingly to the washing required.

The ratchet wheel 45 is provided with an elongated notch 81 adapted to accommodate the revolutions of the pin 43 in case of accidental over-travel of the ratchet.

When the motor is operated, the tooth 43 rotates the ratchet wheel one tooth at every revolution of the shaft 28 and the dog 44′ in constant engagement with the toothed rim of wheel 45 serves to prevent back movement of such wheel. The pivotal center 83 of the oscillating post 46 and arm 47 is at a considerable distance from the ratchet wheel, so that when the cam 59 acts upon the arm 47 the post will be considerably deflected thus to withdraw the toothed rim of wheel 45 from the path of the dog 44′ and the ratchet teeth 44 as hereinbefore stated.

In order to accommodate this tilting movement of the ratchet wheel, the face 82 of the trip lever is shown oblique to the body of said lever.

When the tooth 43 operates the ratchet wheel, it eventually brings the set pin 73 into position to lift the latch 69, whereupon the restoring spring 58 operates to cause the cam 59 to oscillate the arm 47, thus extending the spring 48, which at a succeeding oscillation of the handle 55 by the operator, will contract and return the arm 47 and withdraw the cam 59 to the position shown in Fig. 11.

The poise is detachably fastened to post 46 by cotter pin 84 and is provided with a counterweight 85 to make the operation of the parts smooth.

Referring to Fig. 1 the charging spout 86 leading from the mixing trough, not shown, is controlled by a gate 87 through the lever 88 that is provided at one end with a counter-balance 89 and at the other end with a handle 90 and is fulcrumed at 91 to a bracket 92 projecting from the spout 86. Said lever 88 is connected to the gate 87 in the usual way as at 93.

The tappet for communicating motion from the nozzle oscillating cam 27 to the nozzle oscillating arm 22, is preferably made up of the rod 24 having anti-friction balls 94 seated in flat bearing end sockets 95 and held in place by spinning over the rims at the ends of the rod to form the annular overhangs as indicated at 96 to retain the balls 94 in said sockets. The cam surface is kept well lubricated and said lubrication finds its way into the cavity of the socket 95. The flat bearing face of each cavity is tangent to the surface of the ball so that there is sufficient antifriction effect to cause the ball to rotate in the tappet and to roll on the cam surface, thus to avoid wearing the cam surface.

In practical operation, the parts being in position shown in Fig. 1, the attendant will open the gate 87 and allow the charge of massecuite to flow into the basket 1. When the basket has thus been charged and spun to throw out the bulk of the syrup, the attendance will move the controlling handle 55 from the rest position indicated in Figs. 2 and 12 to the operating position indicated in Figs. 10, 11 and 11ª thereby opening valve 97 and closing the electric circuit and setting the motor in operation which simultaneously revolves the cam 27 and the tooth 43. At each revolution of the tooth 43 the ratchet wheel is advanced one step and as the tooth 43 escapes the notch of the ratchet wheel, the dog 44′ holds the ratchet wheel from being retracted by the clock spring 52. The continued operation of the ratchet wheel by the tooth 43 eventually moves the unlatching set pin 58 to the latch 69, and causes said pin to lift the latch. In Fig. 12 this will occur after twelve complete oscillations. In Fig. 11ª the operation will occur after five oscillations as indicated by the ordinal 5 on the dial, at which the pin is seated.

At each revolution of the cam shaft the oscillating arm 22 is given one complete oscillation from bottom to top and return to bottom; and the speed at which the nozzle oscillates past any horizontal trace of the inside wall of the sugar column will bear a relation to the radius of the active point of cam 27 that is operating upon the tappet at that particular instant; said speed will vary depending upon the radius of the cam at the various active points; being comparatively low as the radius of the cam at the active point is long, and high as such radius is short.

When the unlatching pin lifts the latch, the finger 68 escapes from the tooth 71 and allows the ratchet wheel and dial to respond to the retracting spring 58 which returns the parts to the rest position. The oscillation of the shaft 56 caused by the spring 58 and cam 59 withdraws the finger 61 so as to release the contact spring 63. It also applies the cam 59 to oscillate the swinging arm 47 and the ratchet wheel into tilted position, shown in Fig. 3, thus extending the spring 48 which yieldingly holds the oscillating arm 47 normally in the operative position shown in Figs. 10 and 11.

The shaft 100 of the worm 33 is journaled in the bearing 101 and is provided outside said bearing with a friction disk 102 keyed or otherwise made rigid upon the shaft to rotate therewith. Said friction disk 102 is preferably made of wrought iron, and a brake shoe made of any suitable material, as a fiber, or poplar or elm wood block 103 mounted in a hollow head 104, is carried by two guides 105, 106, that are fixed to the case 30. Said head 104 is adjustable on said guides towards and from said friction disk by suitable means as springs 107 to create friction upon a brake-releasing cam 108 which is fixed on the controlling shaft 56 and acts upon an anti-friction roller 109 that is journaled to a yoke 110 that moves with said head. When the controlling shaft is in running position, the cam 108 acts upon the roller 109 to withdraw the block 103 from the friction disk 102 so as to leave the worm shaft free to turn, until the controlling lever is released by lifting of the latch as above described.

When said latch is lifted and the spring 58 returns the controlling shaft to rest position, the cam 108 releases the yoke and the cam and the springs apply the brake shoe 103 to the head 102 and thus stops the worm shaft, its motor and the cam on the instant.

It is understood that although by this discovery and invention I have made it possible to deliver the exact amount of water required at each level of the sugar column, that said invention may be employed with various degrees of advantage over the prior art by using substantial embodiments of the invention constructed with various degrees of inaccuracy, and I desire to secure the exclusive right to the invention and discovery herein set forth and claimed, in whatever form the same may be constructed or performed.

I claim.

1. The method of washing centrifugals which consists in applying the washing fluid to the column of centrifugals in conformance to the parabola formed by superficial traces of the axial section of such column.

2. The method set forth of washing centrifugals which consists in delivering successively to predetermined zones of the column of centrifugals, predetermined spray of washing water in times adapted to deliver to each zone a quantity of water directly and accurately proportional to the mass of sugar in such zone.

3. The method set forth of washing centrifugals which consists in successively delivering to predetermined zones of the column of centrifugals a spray of washing water; said spray delivering to each zone a quantity of water practically proportional to the mass of sugar in such zone.

4. The method of washing centrifugals which consists in applying water through a nozzle and oscillating the nozzle conformable substantially to the parabolic projection of an axial section of the cavity of the column of said centrifugals.

5. The method of washing centrifugals which consists in supplying water to the walls of the cavity of said centrifugals in a spray applied successively to the various levels in accordance with the thickness of the sugar wall at such level.

6. The method set forth of washing centrifugals which comprises the application of water to various levels of the walls of the cavity of the centrifugals in accordance substantially with the thicknesses of the sugar wall at such levels respectively as predetermined by the parabolic trace where the water is supplied.

7. In the art of washing sugar centrifugals, the method set forth which consists in successively delivering to the various zones of the column of centrifugals quantities of water substantially conformable to the axial section of said column.

8. The method of washing centrifugals which consists in applying water through a nozzle to the inside of the cavity of the centrifugals and operating a nozzle along the trace of the axial section of the cavity; said application being varied in time to conform to the shape of the cavity.

9. The method of washing centrifugals which consists in applying the washing water to the massecuite in the revolving centrifugal basket in proportion to the flare of the cavity in said centrifugals.

10. The method set forth of washing centrifugals by the horizontal flow of water therethrough under centrifugal impulse, which method consists in successively applying a requisite quantity of wash water to each portion of the wall at the successive levels according to the thicknesses of the mass at such levels respectively.

11. In the art of washing sugar centrifugals, the method set forth of sweeping a vertically thin elongated spray of wash water substantially from top to bottom and from bottom to top of said centrifugal, the speed with which said spray sweeps along being definitely fixed for each point.

12. In the art of washing sugar centrifugals, the method set forth of sweeping a vertically thin spray of wash water formed by a multiplicity of smaller jets substantially from top to bottom and bottom to top of said centrifugal, the speed with which said spray sweeps along being definitely fixed for each point.

13. In the art of washing sugar centrifugals, the method set forth of oscillating a nozzle so as to sweep a vertically thin elongated spray of wash water substantially from top to bottom and bottom to top of said centrifugal, the speed with which said spray sweeps along being definitely fixed for each point.

14. In the art of washing sugar centrifugals, the method set forth of sweeping a vertically thin elongated spray of wash water with variable speed definitely predetermined for each point so as to deliver to each zone of sugar a quantity of wash water substantially conformable to the amount of sugar in that zone.

15. The combination with a centrifugal basket and means to revolve the basket; of an oscillating nozzle adapted to deliver water to the wall of the cavity in the basket; and means to oscillate the nozzle at a differential speed varying at different levels in proportion to the thickness of the mass of sugar at such levels.

16. The combination with a centrifugal basket and means to revolve said basket, of a nozzle and a cam; said cam being conformed to the parabolic trace of the cavity within the wall where the water is supplied.

17. In a machine for washing centrifugals, an oscillating nozzle adapted to project a vertically thin, elongated spray across the cavity of the centrifugal against the revolving wall of the centrifugal which receives it.

18. In a machine for washing centrifugals, an accurate cam and an oscillating nozzle oscillated by said cam and adapted to project a vertically thin elongated spray across the cavity of the centrifugal against the revolving wall of the centrifugal which receives it.

19. In a machine for washing centrifugals, accurately operating actuating mechanism and an oscillating nozzle actuated by said mechanism and adapted to project a vertically thin spray comprising a multiplicity of individual jets across the cavity of the centrifugal against the revolving wall of the centrifugal which receives it.

20. In a machine for washing sugar centrifugals, a nozzle adapted to sweep a vertically thin elongated spray differentially up and down along the sugar in the centrifugal.

21. The combination with a centrifugal basket and means to revolve said basket, of a cam, an oscillating lever pivotally mounted on an axis and operable by the cam, and a nozzle oscillated by the lever with differential speed, said lever being in operative connection with the cam at a point below the axis of the cam.

22. The combination with a centrifugal basket and means to revolve the same and to thereby form a hollow column of sugar to be washed, of a cam, a shaft to revolve the cam, said cam being adapted to slide on the shaft and revolve therewith, said cam being of different diameters and adapted to be shifted longitudinally of said shaft into operative relation according to the different portions of the perimeter of the cam which may be requisite to the delivery of water in proportion to the trace of the axial section of the cavity in the column of sugar to be washed.

23. In a machine for washing sugar centrifugals, a nozzle actuated to sweep a spray of wash water substantially from top to bottom and from bottom to top of the sugar wall in said centrifugal, and nozzle actuating means adapted to actuate the nozzle differentially so that more water is delivered in the lower regions and less in the upper regions.

24. In a machine for washing sugar centrifugals, a nozzle oscillated to sweep a spray of wash water substantially from top to bottom and from bottom to top of the sugar wall in said centrifugal, and nozzle oscillating means adapted to oscillate the nozzle differentially so that more water is delivered in the lower regions and less in the upper regions.

25. In a machine for washing flared sugar in centrifugals, a nozzle adapted to sweep a spray of wash water up and down along the sugar wall in said centrifugal, a nozzle actuating cam adapted to actuate said nozzle differentially, said cam having various traces corresponding with the various degrees of sugar flare.

26. In a machine for washing flared sugar in centrifugals, an oscillating nozzle adapted to sweep a spray of wash water up and down along the sugar wall in said centrifugal, a nozzle oscillating cam adapted to oscillate said nozzle differentially said cam having various traces corresponding with the various degrees of sugar flare, and means for bringing the various traces of said cam into operative position so that the nozzle may be oscillated in accordance with the particular trace selected.

27. In a machine for washing flared sugar in centrifugals, a nozzle adapted to sweep a spray of wash water up and down along the sugar wall in said centrifugal, a nozzle actuating cam adapted to actuate said nozzle differentially, said cam having various traces corresponding with the various degrees of sugar flare, and means for bringing the various traces of said cam into operative position so that the nozzle may be actuated in accordance with the particular trace selected.

28. In a machine for washing centrifugals, a nozzle arranged to direct its spray across the cavity of the hollow wall of the sugar column; means to supply a spray through the nozzle; and means to oscillate the nozzle up and down with a speed that is slower at lower levels than at the higher levels.

29. In a machine for washing centrifugals, the combination with a basket and means for revolving said basket, of a nozzle adapted to deliver a vertically thin spray to the inside wall of sugar column in the basket; and means to oscillate the nozzle with a movement that is comparatively slow at the lower level while the spray is being directed from the nozzle to the bottom of the sugar wall; and that is gradually increased as the spray approaches the top of the sugar wall.

30. The combination with a centrifugal basket and means to revolve the same, of a cam; a shaft to revolve the same, said cam being adapted to slide on the shaft and to revolve therewith; a tappet, and a nozzle oscillatable by the tappet to deliver wash water to a sugar column in the basket; said cam being of different diameters adapted to be shifted longitudinally of said shaft to bring the cam into operative relation to the tappet according to the different portions of the perimeter of the cam which may be requisite to the delivery of wash water in proportion to the parabola of the trace of the axial section of the cavity in the column of sugar to be washed, and a nozzle oscillatable by the cam.

31. In an apparatus for washing sugar centrifugals comprising a centrifugal basket and means for revolving the basket; an oscillating nozzle and means for oscillating the nozzle up and down with relation to the basket; said means comprising a cam the operative face of which has units of circular measurement that are correlative to successive oblong areas which are respectively equal to successive level layers of the sugar column.

32. Apparatus for washing sugar centrifugals, comprising a centrifugal basket; means for revolving the basket; a nozzle; means to supply liquid under pressure to said nozzle; and means to oscillate the nozzle to deliver spray through the nozzle to the inside wall of the hollow sugar column to be washed, for periods of greater length at the lower levels than at the higher levels.

33. Means for washing centrifugals comprising a centrifugal basket; means for revolving the same; a nozzle; and means adapted to oscillate the nozzle up and down with a movement that is comparatively slow at the lower levels and is increased in speed at the higher levels.

34. Means for washing centrifugals comprising a centrifugal basket; means for revolving the same; a nozzle adapted to project a vertically thin spray of wash water; means adapted to oscillate the nozzle up and down with a movement that is comparatively slow at the lower levels and is increased in speed at the higher levels; means to supply water to the nozzle and means for automatically cutting off the water supply when a predetermined cycle of substantially complete oscillations has been accomplished.

35. In a machine for washing sugar centrifugals, a nozzle actuated to sweep a vertically thin spray of wash water comprising a multiplicity of jets, substantially from top to bottom and from bottom to top of the sugar in said centrifugal, nozzle-actuating means, and automatic means for governing the wash water so that it flows substantially for a predetermined number of complete strokes of the nozzle.

36. In a machine for washing centrifugals. a nozzle oscillated to sweep a spray of wash water substantially from top to bottom and from bottom to top of the sugar wall in said centrifugal, nozzle oscillating means, and automatic means for governing the wash water so that it starts to flow when the nozzle is near an extreme point in its stroke and stops flowing when the nozzle is near an extreme point in its stroke.

37. In a machine for washing centrifugals, a nozzle actuated to sweep a spray of wash water substantially from top to bottom and from bottom to top of the sugar in said centrifugal, means for actuating said nozzle differentially in accordance with the different thicknesses of the sugar wall at the different levels in the centrifugal, and means for governing the wash water so that it flows substantially for a predetermined number of complete strokes of the nozzle.

38. In a machine for washing centrifugals, a nozzle oscillated to sweep a spray of wash water substantially from top to bottom and from bottom to top of the sugar in said centrifugal, means for oscillating said nozzle differentially in accordance with the different thicknesses of the sugar wall at the different levels in the centrifugal, and automatic means for governing the wash water so that it starts to flow when the nozzle is near an extreme point in its stroke and stops flowing when the nozzle is near an extreme point in its stroke.

39. In apparatus for washing centrifugals, the combination with a centrifugal basket, of a nozzle, a cam to operate the nozzle up and down to direct wash water onto the cavity wall of the column of the centrifugal, and cam operating means, the surface of said cam being made up of numerous operating traces differing from each other conformable to the different obliquities of the up and down traces of the cavity face.

40. In apparatus for washing centrifugals, a nozzle adapted to direct wash water onto the face of the cavity of the hollow column of centrifugals, a cam to operate the nozzle, said cam being made up by separate extreme cam traces at the ends of the cam for the extremes of rapid and slow movement of the nozzle and intermediate peripheral cam traces bounded by straight longitudinal traces, the ends of which conform to the correlative points of the extreme cam traces.

41. In apparatus for washing centrifugals, a nozzle adapted to direct wash water onto the face of the cavity of the hollow column of centrifugals; a tappet connected to oscillate the nozzle; a cam to operate the tappet and made up by separate extreme cam traces at the ends of the cam for the extremes of rapid and slow movement of the tappet and producing the intermediate peripheral cam traces bounded by straight longitudinal traces the ends of which conform to the correlative points of the extreme cam traces; the longitudinal traces of the cam being oblique to the axis of the cam throughout a greater portion of the perimeter of the cam, and being parallel to such axis at that portion of the cam that is active at the top turn of the oscillation.

42. In apparatus for washing centrifugals, a nozzle adapted to direct wash water onto the face of the cavity of the hollow column of centrifugals; a tappet connected to oscillate the nozzle; a cam to operate the tappet and made up by separate peripheral traces made up of extreme cam traces at the ends of the cam for the extremes of rapid and slow movement of the tappet and intermediate cam faces by straight longitudinal traces the ends of which conform to correlative points of the extreme cam traces; and means to adjust the cam relative to the tappet; the heel of the cam being formed with a depression so as to deliver wash water for a larger period at the top and bottom of the centrifugal basket.

43. The combination with a nozzle for washing centrifugals, of means for oscillating said nozzle differentially comprising a cam and a tappet; said cam having a flat plane at its apex and a depression at its heel to give longer washing periods at top and bottom of the massecuite column than at intermediate portions of said column.

44. In a machine for washing sugar centrifugals, a nozzle adapted to sweep a vertically thin spray of wash water comprising a multiplicity of individual jets substantially from top to bottom and from bottom to top of the sugar in said centrifugal, and means for actuating the nozzle so that the spray has a period of substantial dwell in the vicinity of an extreme point of its stroke.

45. In a machine for washing sugar centrifugals, a nozzle adapted to sweep a vertically thin spray of wash water comprising a multiplicity of individual jets substantially from top to bottom and from bottom to top of the sugar in said centrifugal, and means for actuating the nozzle including a cam adapted to impress upon the spray a period of substantial dwell in the vicinity of an extreme point of its stroke.

46. In a machine for washing sugar centrifugals, a nozzle adapted to sweep a vertically thin elongated spray of wash water substantially from top to bottom and from bottom to top of the sugar in said centrifugals, and means for actuating the nozzle including a cam having a relatively inactive portion on its face adapted to impress upon the spray a period of substantial dwell in the vicinity of an extreme point of its stroke.

47. In a machine for washing sugar centrifugals, a nozzle adapted to sweep a vertically thin spray of wash water from top to bottom and from bottom to top of the sugar in said centrifugal, and means for actuating the nozzle including a cam having a relatively inactive portion on its face adapted to impress upon the spray a period of substantial dwell in the vicinity of an extreme point of its stroke, said cam being graduated at some of the portions of its face to sweep the spray along differentially in accordance with the varying thickness of the sugar wall at the successive levels.

48. In a machine for washing sugar centrifugals, an oscillating nozzle adapted to sweep a vertically thin spray of wash water comprising a multiplicity of individual jets, substantially from top to bottom and from bottom to top of said sugar in said centrifugal, and means for oscillating the nozzle including a cam having a relatively inactive portion on its face adapted to impress upon the spray a period of substantial dwell in the vicinity of an extreme point of its stroke.

49. In an apparatus for washing sugar in a centrifugal basket, a spray nozzle adapted to direct a vertically narrow liquid spray against a vertically narrow area of the sugar collected on the inside wall of the centrifugal basket; and means to oscillate the nozzle up and down with differential speed.

50. In an apparatus for washing sugar in a centrifugal basket, a spray nozzle adapted to direct a vertically narrow liquid spray against a vertically narrow area of the sugar collected on the inside wall of the centrifugal basket; and means to oscillate the nozzle up and down to deliver the spray onto said wall with a movement that is timed practically in accordance with the thickness of the wall, the slower movement being at the thicker portion of the wall and the more rapid movement at the thinner portions substantially as and for the purpose set forth.

51. In an apparatus for washing sugar in a centrifugal basket, a spray nozzle adapted to direct a liquid spray against the sugar collected in said basket, means for actuating said nozzle with differential speed so as to sweep said spray substantially from top to bottom and from bottom to top of the sugar in said basket, delivering at each level an amount of water substantially proportional to the thickness of the sugar at that level, a stationary valve, means including a flexible tube for connecting said stationary valve with said actuated nozzle, and means for automatically closing said stationary valve when the predetermined amount of wash water has been discharged through said nozzle.

52. In a machine for washing sugar centrifugals, a nozzle oscillated to sweep a vertically thin spray of wash water substantially from top to bottom and from bottom to top of the sugar in said centrifugal, and means for oscillating said nozzle so that the spray has a period of substantial dwell in the vicinity of an extreme point of its stroke.

53. In a machine for washing sugar centrifugals, a nozzle actuated to direct a spray of wash water against the sugar in said centrifugal, nozzle actuating means adapted to actuate said nozzle so as to sweep said spray of wash water successively past the various levels of sugar between one end and another end of the centrifugal, said nozzle being actuated with a differential speed adapted to deliver more water at the lower levels of sugar and less water at the upper levels of sugar.

54. In a machine for washing sugar centrifugals, a nozzle oscillated to direct a spray of wash water against the sugar in said centrifugal, nozzle-oscillating means adapted to oscillate said nozzle so as to sweep said spray of wash water successively past the various levels of sugar between one end and another end of the centrifugal, said nozzle being oscillated with a differential speed adapted to deliver more water at the lower levels of sugar and less water at the upper levels of sugar.

55. In a machine for washing sugar centrifugals, a nozzle actuated to direct a vertically thin spray of wash water comprising a multiplicity of jets against the sugar in said centrifugal, nozzle-actuating means adapted to actuate said nozzle so as to sweep said spray of wash water successively past the various levels of sugar between one end and another end of the centrifugal, and means for automatically governing the flow of wash water so that the point in its stroke where it stops flowing is substantially the same as the point in its stroke where it commences to flow.

56. In a machine for washing sugar centrifugals, a nozzle oscillated to direct a spray of wash water against the sugar in said centrifugal, nozzle oscillating means adapted to oscillate said nozzle so as to sweep said spray of wash water successively past the various levels of sugar between one end and another end of the centrifugal, and means for automatically governing the flow of wash water so that the point in its stroke where it stops flowing is substantially the same as the point in its stroke where it commenced to flow.

57. In a machine for washing sugar centrifugals, a nozzle oscillated to direct a spray of wash water against the sugar in said centrifugal, a cam for oscillating said nozzle so as to sweep said spray of wash water successively past the various levels of sugar between one end and another end of the centrifugal, the point on said cam constituting the point of operative connection between said cam and nozzle being always below the body of said cam.

In testimony whereof, I have hereunto set my hand at Washington, D. C. this 10th day of January, 1923.

ROBERT ALEXANDER STEPS.

Witnesses:

ARTHUR P. GILL,
D. L. BRANUM.